(12) United States Patent
Yoshida

(10) Patent No.: US 7,516,552 B2
(45) Date of Patent: Apr. 14, 2009

(54) GUIDE AND PORTABLE CUTTING TOOL PROVIDED THEREWITH

(75) Inventor: Hirokazu Yoshida, Niigata (JP)

(73) Assignee: Hitachi Koki Co., Ltd., Tokyo (JP)

( * ) Notice: Subject to any disclaimer, the term of this patent is extended or adjusted under 35 U.S.C. 154(b) by 269 days.

(21) Appl. No.: 11/476,059

(22) Filed: Jun. 28, 2006

(65) Prior Publication Data

US 2007/0095186 A1 May 3, 2007

(30) Foreign Application Priority Data

Jun. 30, 2005 (JP) ............... P2005-193062

(51) Int. Cl.
*B27B 9/04* (2006.01)

(52) U.S. Cl. ............... 30/373; 30/371; 30/391; 83/745

(58) Field of Classification Search ............... 30/371, 30/373, 374, 375, 376, 377, 391; 83/745
See application file for complete search history.

(56) References Cited

U.S. PATENT DOCUMENTS

| | | | | | |
|---|---|---|---|---|---|
| 2,773,523 | A | * | 12/1956 | Hopla | ............... 83/745 |
| 2,800,933 | A | * | 7/1957 | Michael | ............... 30/373 |
| 3,043,351 | A | * | 7/1962 | Davis | ............... 30/373 |
| 5,815,931 | A | * | 10/1998 | Cleveland | ............... 30/373 |
| 6,708,411 | B2 | * | 3/2004 | Kani | ............... 30/376 |
| 6,757,981 | B2 | * | 7/2004 | Hampton | ............... 30/372 |
| 7,174,641 | B2 | * | 2/2007 | Kondo et al. | ............... 30/371 |
| 2004/0168327 | A1 | | 9/2004 | Kondo et al. | |

FOREIGN PATENT DOCUMENTS

| | | | |
|---|---|---|---|
| EP | 1707328 A1 | * | 10/2006 |
| JP | 7-701 | | 1/1995 |
| JP | 2004-188738 | | 7/2004 |

* cited by examiner

*Primary Examiner*—Hwei-Siu C Payer
(74) *Attorney, Agent, or Firm*—Mattingly, Stanger, Malur & Brundidge, P.C.

(57) ABSTRACT

A portable cutting tool includes: a cutting tool main body having a motor, a rotating blade and a saw cover for covering a part of the rotating blade, a base including a slide surface and a supporting part, and a guide including a pole supported by the supporting part, and a guiding part having a guide surface substantially orthogonal to the slide surface. An interposition member can be disposed so as to interpose between the guide and a side end of the base. The distance between the rotating blade and the guide surface is adjustable by changing a position of the guide. The portable cutting tool includes a contact preventing unit is provided for regulating an adjustment range of the guide to prevent contact of the guide surface and the rotating blade when the guide is attached to the base with the interposition member removed.

9 Claims, 16 Drawing Sheets

GUIDE AND PORTABLE CUTTING TOOL PROVIDED THEREWITH

BACKGROUND OF THE INVENTION

1. Field of the Invention

The present invention relates to a portable cutting tool. A portable electric circular saw is described hereinafter as an example of the portable cutting tool.

2. Background Art

An example of a conventional portable electric circular saw is shown in FIG. 1 and FIG. 2.

As shown in FIG. 1, the portable cutting tool includes a rotating blade 1 rotationally driven by a motor (not shown), a cutting tool main body 2 to which the cutting blade 1 is attached, and a base 4 having a slide surface 3 which slides on an upper surface of a material to be cut. The cutting tool main body 2 is connected to the base 4 so as to be rotatable around a supporting shaft 5.

The cutting tool main body 2 has a motor cover 6 which covers the motor, and a gear box 7 which covers a transmitting mechanism part for reducing the rotation speed of the motor with a gear (not shown) and transmitting the rotation to the cutting blade. The motor cover 6 is connected to the gear box 7 with screws (not shown).

A saw cover 8 having a shape so as to cover the rotating blade 1 projecting at the other side of the slide surface 3 of the base 4, or the rotating blade part above the base 4, is connected to the gear box 7. A safety cover 9 having a shape so as to cover the rotating blade 1 projecting below the slide surface 3 of the base 4 is urged to the slide surface on the base 4 by a spring (not shown) to be connected to the gear box 8. Additionally, the safety cover 9 is operable by a lever 10.

A handle 12 having a switch 11 for switching on or off the motor, which is gripped by an operator during work is attached to the motor cover 6.

The handle 12 is gripped and pushed in the arrow A direction (right in FIG. 1) by an operator, thereby cutting a material to be cut advancing in the right direction in FIG. 1. Since there is a gap between the handle 12 and the rotating blade 1, it is difficult to accurately cut along the cut direction A. Therefore, cutting work is usually performed while a guide surface 14 of a guide 13 which is attached to the base 4 as shown in FIG. 3 is brought into contact with the side surface of the material to be cut.

As shown in FIG. 5, a circular saw shown in FIG. 4 is used so that work for cutting a floor material 15 located at the edge of the wall (hereinafter referred to as an edge cutting) is effectively performed. The cutting tool main body 2 is tilted in relation to the base 4 around the rotating shaft 5 so that the circular saw (hereinafter referred to as an edge cutting circular saw) can cut with the cutting blade 1 projecting outside a side end 16 of the base 4 on the opposite side of the motor.

The base 4 is rotatable in a range that the cutting tool main body 2 rotates at approximately 12° on the motor side and at approximately 45° on the opposite side of the motor around the supporting shaft 5 provided parallel to a cutting direction by the cutting tool main body 2, or parallel to an extension surface of the rotating blade 1.

A base side link, in which an arc-shaped long hole is provided around the supporting shaft 5, is provided at the front part of the base 4 in the cutting direction. Additionally, a main body side link 18, in which an arc-shaped long hole 17 is provided around the supporting shaft 5, is provided at the front part of the cutting tool main body 2 in the cutting direction. A bolt is provided as fixing means 19 capable of fixing the cutting tool main body to a desired tilted position by bringing the long hole provided in the base side link into press-contact with the long hole 17 provided in the main body side link 18 with the cutting tool main body 2 tilted in relation to the base 4 at a desired angle.

The edge cutting circular saw is formed in such a way that the width of the base 4 is reduced so that the side end 16 on the opposite side of the motor the base 4 is almost located on the extended line of the rotating blade 1. The rotating blade 1 easily projects outside the side end 16 of the base 4 and the edge cutting is easily performed by this construction.

When cutting work other than the edge cutting work is performed with the edge cutting circular saw, a sub-base 20 (see JP-A-2004-188738) for reinforcing the base 1, of which the width is reduced, shown in FIG. 6, or a dust guard 22 capable of sliding on poles 21 of the guide 13 shown in FIG. 8 and FIG. 9 and for preventing dust from jetting is attached to the edge cutting circular saw.

When the cutting work is performed with the sub-base 20 attached, as shown in FIGS. 10 to 12, the work is performed by attaching the guide 12 for accurately cutting.

The sub-base 20 and the dust guard 22 are interposition members interposing between the guide and the side end 16 on the opposite side of the motor of the base 4 in a case where a guiding part of the guide 13 is located on the opposite side of the motor, the side end 16 side where the rotating blade projects from the base.

Supporting parts 23 into which the pole 21 can be inserted are respectively provided on the front and back of the base 4 in the cutting direction in order to support the poles 21 of the guide 13, and a guide fixing bolt 25 for fixing the guide 13 movable in a direction parallel to a rotating shaft 24 of the rotating blade 1 at a desired position is provided on the supporting part 23. By changing the attachment position of the guide 13 to the base 4, the distance of the rotating blade 1 and the guide surface 14 can be adjusted.

As shown in FIG. 9, when the guide 13 is moved to the motor side with the dust guard 22 attached, the guide 13 comes into contact with an end surface on the opposite side of the motor the dust guard 22 and the movement thereof is regulated. Therefore, the guide surface 14 of the guide 13 does not come into contact with the rotating blade 1.

Additionally, FIG. 10 shows a state where the guide 13 is attached to the edge cutting circular saw, to which the sub-base 20 is attached. Since the guide surface 14 of the guide 13 is brought into slidable contact with the side surface of the material to be cut and the cutting tool is guided as shown in FIG. 11, the material to be cut can be accurately cut along a marking-off line drawn thereon.

Additionally, as shown in FIG. 12, when the guide 13 is moved to the motor side with the sub-base 20 attached to the edge cutting circular saw, the guide 13 comes into contact with an end on the opposite side of the motor of the sub-base 20 and the movement thereof is regulated. Therefore, the guide surface 14 of the guide 13 does not come into contact with the rotating blade 1.

Moreover, when the sub-base 20 is attached, a first guide 13A may be attached.

SUMMARY OF THE INVENTION

As shown in FIG. 13 and FIG. 15, there is a possibility that some workers attach a guiding part 26 having a guide surface 14 of a guide 13 brought into slidable contact with the side surface of a material to be cut to an edge cutting circular saw so as to locate it at a rotating blade 1 side without attaching a sub-base 20 or a dust guard 22 to the edge cutting circular saw.

In this case, since the edge cutting circular saw is formed in such a way that the width of a base 4 is reduced so that a side end 16 of an opposite side of motor of the base 4 is almost located on an extended line of the rotating blade 1, there is a possibility that the guiding part 26 of the guide 13 comes into contact with the rotating blade 1 or a safety cover 5 as shown in FIG. 14 and FIG. 16. Therefore, there is a possibility that workability and safety are reduced.

Additionally, when the guiding part 26 comes into contact with the rotating blade 1, there is a possibility that the guide 13 is damaged.

It is an object of the present invention to provide a portable cutting tool superior in workability, safety and endurance by solving the above-described problems of the conventional arts.

The invention provides a portable cutting tool, including: a cutting tool main body having a motor, a rotating blade rotationally driven by the motor and a saw cover having a shape so as to cover a part of the rotating blade; a base that is connected to the cutting tool main body and has a slide surface sliding on an upper surface of a material to be cut, the base including a supporting part; and a guide including a pole supported by the supporting part, and a guiding part having a guide surface substantially orthogonal to the slide surface. An interposition member can be disposed so as to interpose between the guide and a side end of the base. A distance between the rotating blade and the guide surface is adjustable by changing a position in the base to which the guide is attached. The portable cutting tool includes a contact preventing unit for regulating an adjustment range of the guide to prevent contact of the guide surface and the rotating blade when the guide is attached to the base while the interposition member is removed.

BRIEF DESCRIPTION OF THE DRAWINGS

The present invention may be more readily described with reference to the accompanying drawings.

DETAILED DESCRIPTION OF THE PREFERRED EMBODIMENTS

A mode in which the present invention is applied to a portable circular saw is described hereinafter with reference to FIGS. 17 to 28. In these figures, the same symbols are attached to the same elements as FIGS. 1 to 16. Therefore, description regarding them will be omitted hereinafter.

A guide 13 has a guide surface 14 which comes into slidable contact with the side surface of a material to be cut, a guiding part 26 for guiding a cutting tool by the slidable contact of the guide surface 14 and the side surface of the material to be cut, and at least one pole 21.

Figure 1:
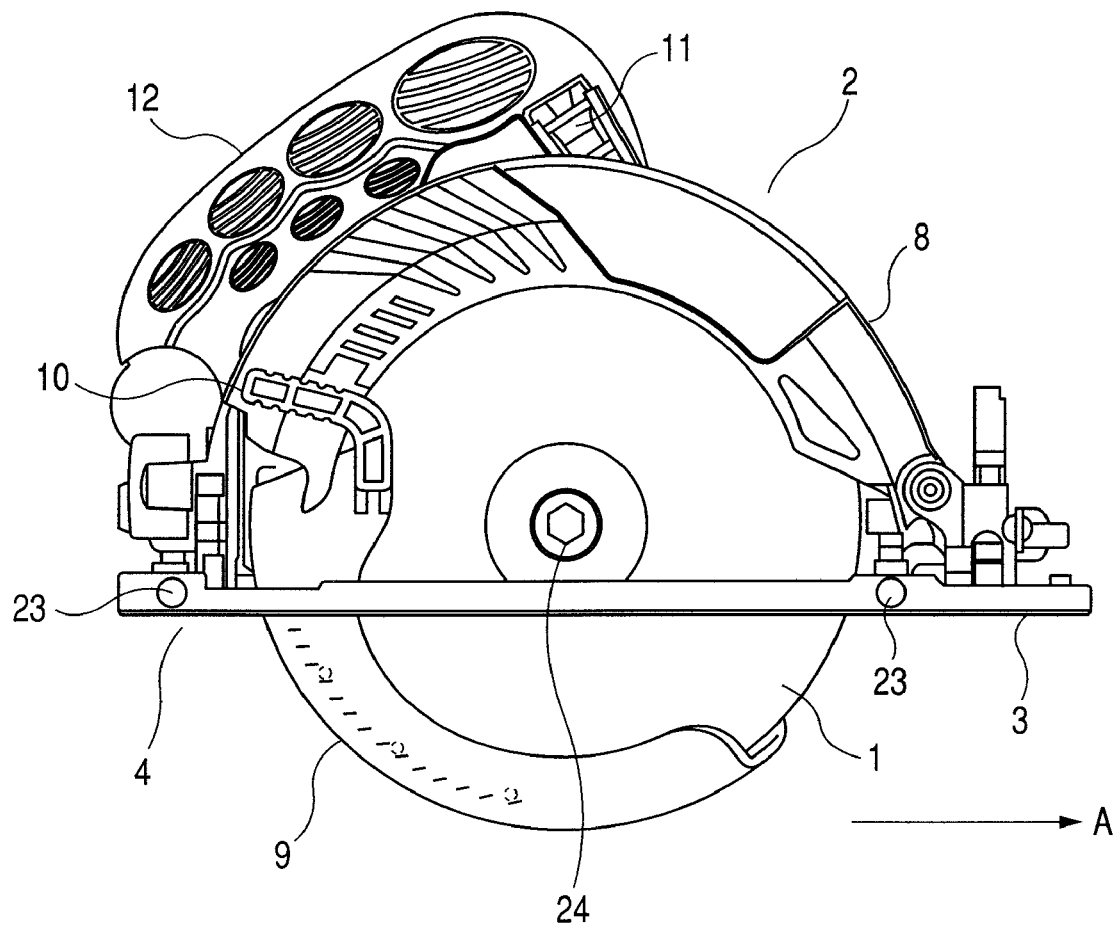
FIG. 1 is a front view showing a conventional portable circular saw.
Figure 2:
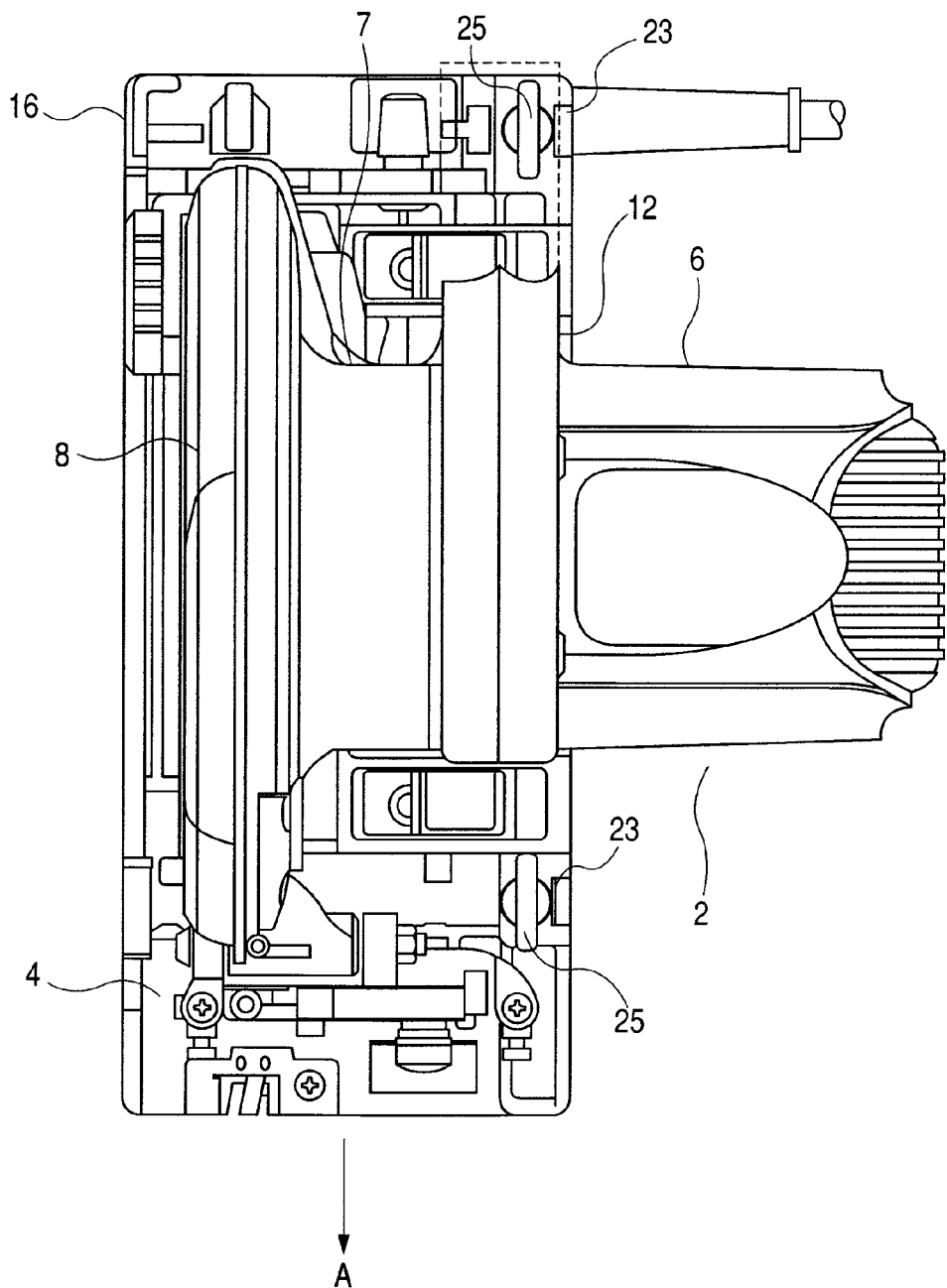
FIG. 2 is a plan view showing the conventional portable circular saw.
Figure 3:
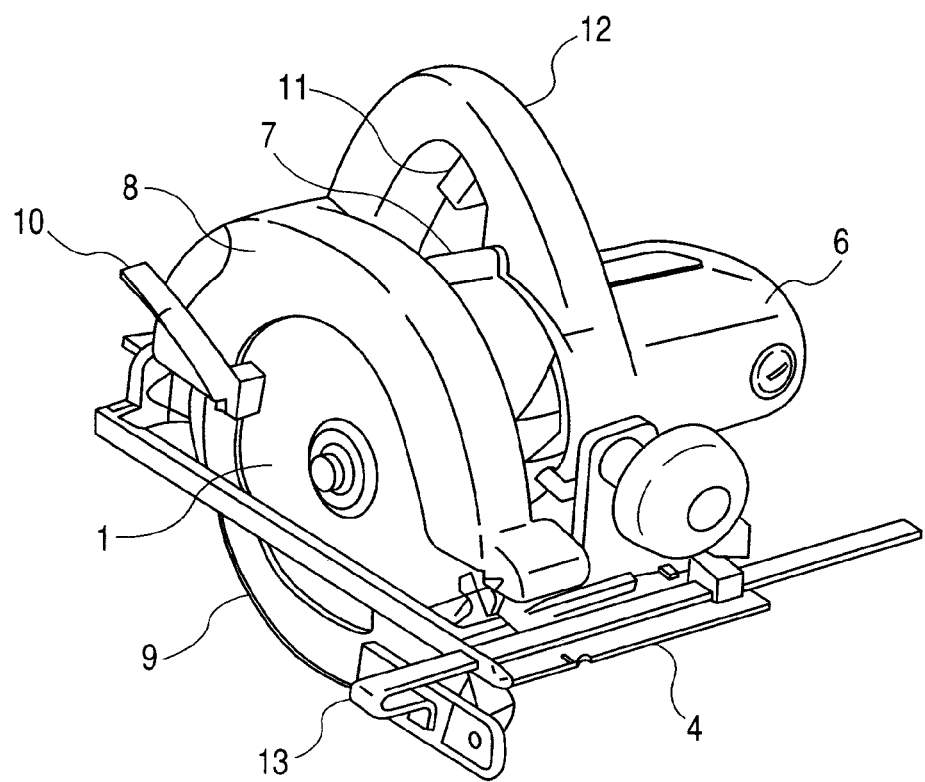
FIG. 3 is a perspective view showing a state where a guide is attached to the conventional portable circular saw.
Figure 4:
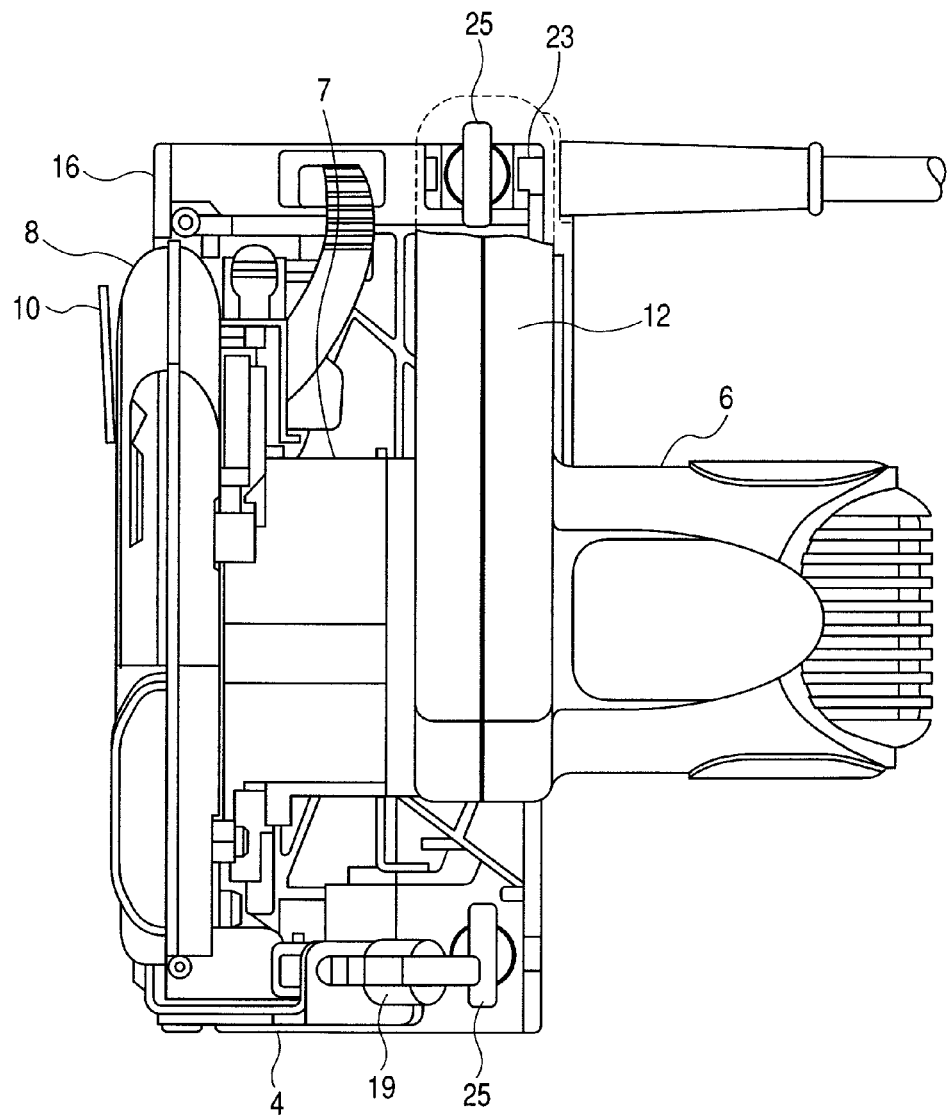
FIG. 4 is a plan view showing a conventional edge cutting circular saw.
Figure 5:
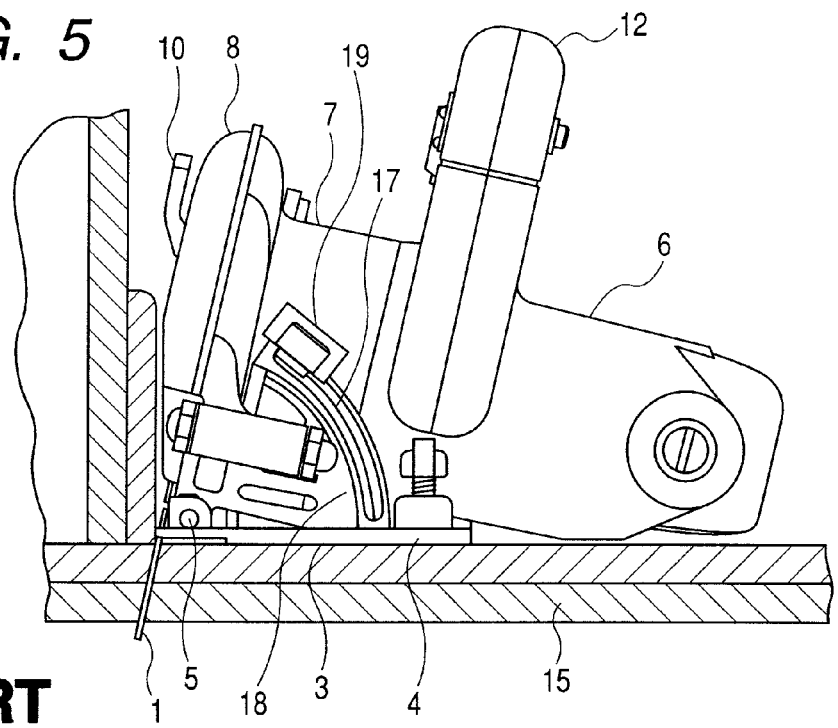
FIG. 5 is a partial cross sectional view showing edge cutting work with an edge cutting circular saw.
Figure 6:
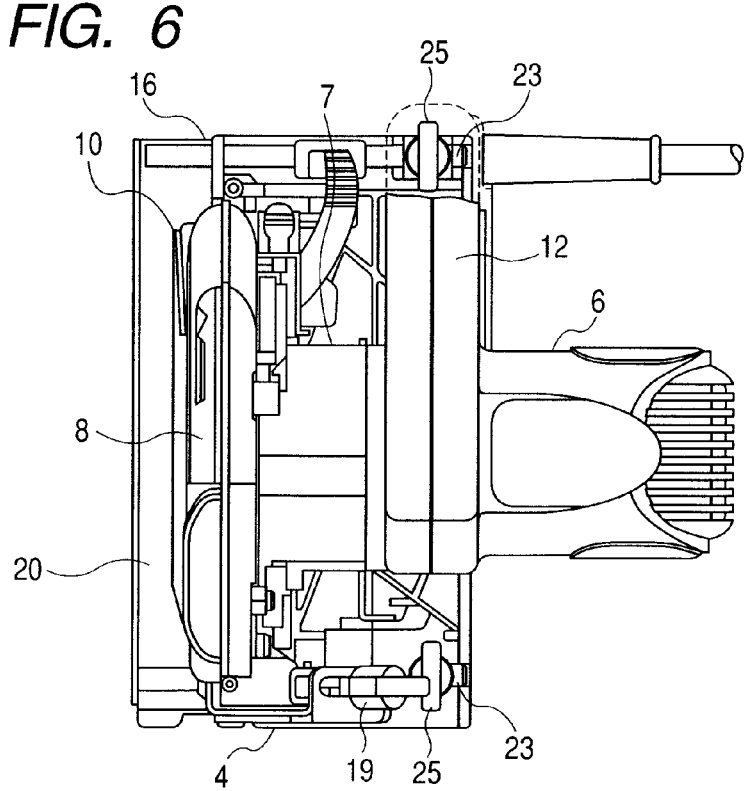
FIG. 6 is a plan view showing a state where a sub-base is attached to the edge cutting circular saw.
Figure 7:
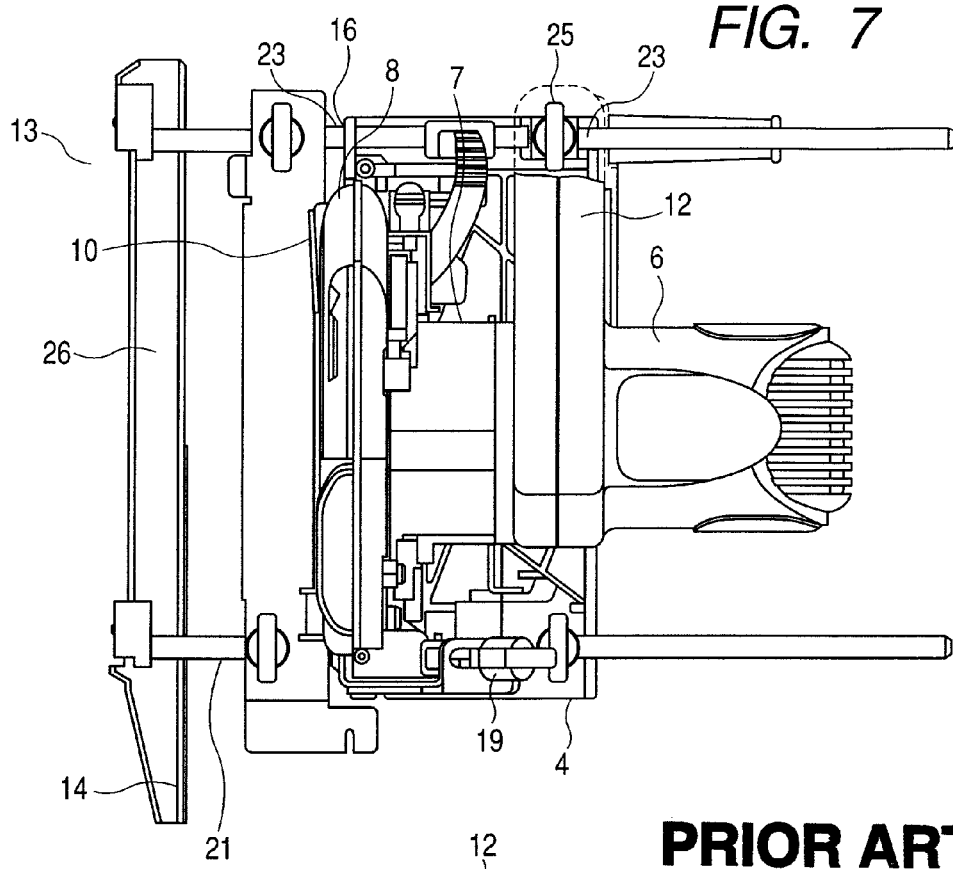
FIG. 7 is a plan view showing a state where a dust guard and a conventional guide are attached to the edge cutting circular saw.
Figure 8:
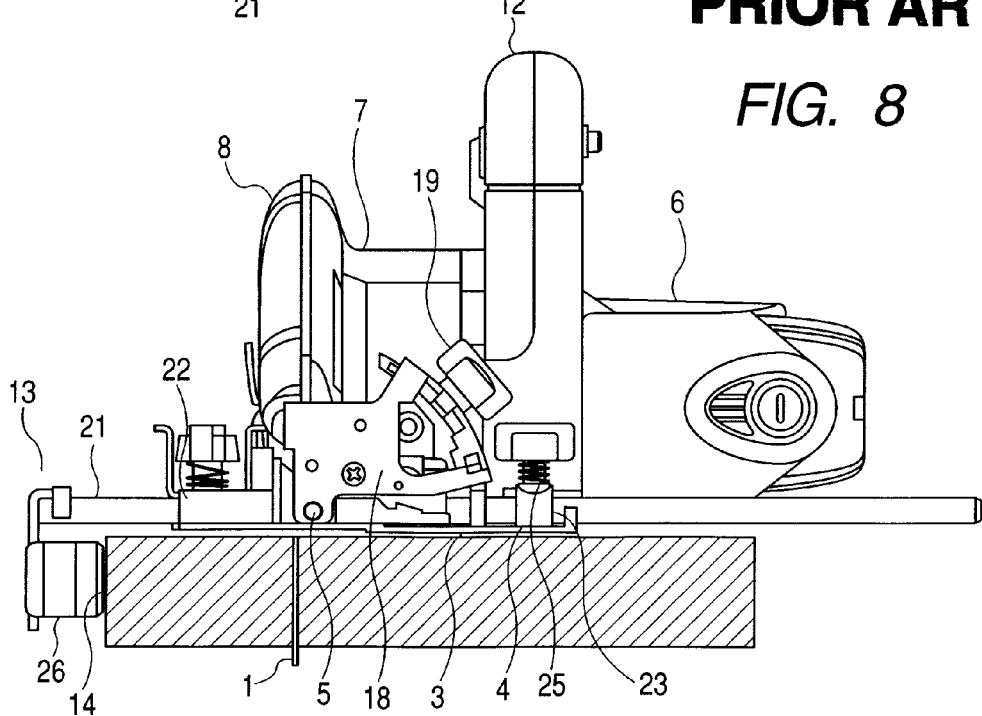
FIG. 8 is a partial cross sectional view showing cutting work in the state where the dust guard and the conventional guide are attached to the edge cutting circular saw.
Figure 9:
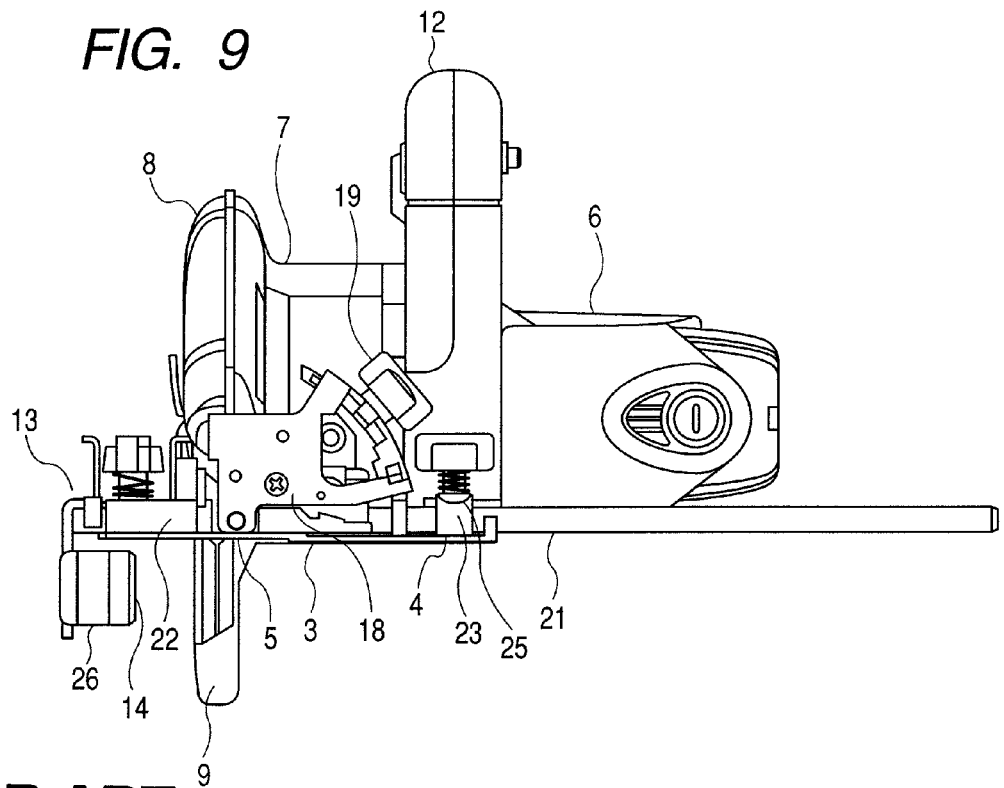
FIG. 9 is a right side view showing the state where the dust guard and the conventional guide are attached to the edge cutting circular saw.
Figure 10:
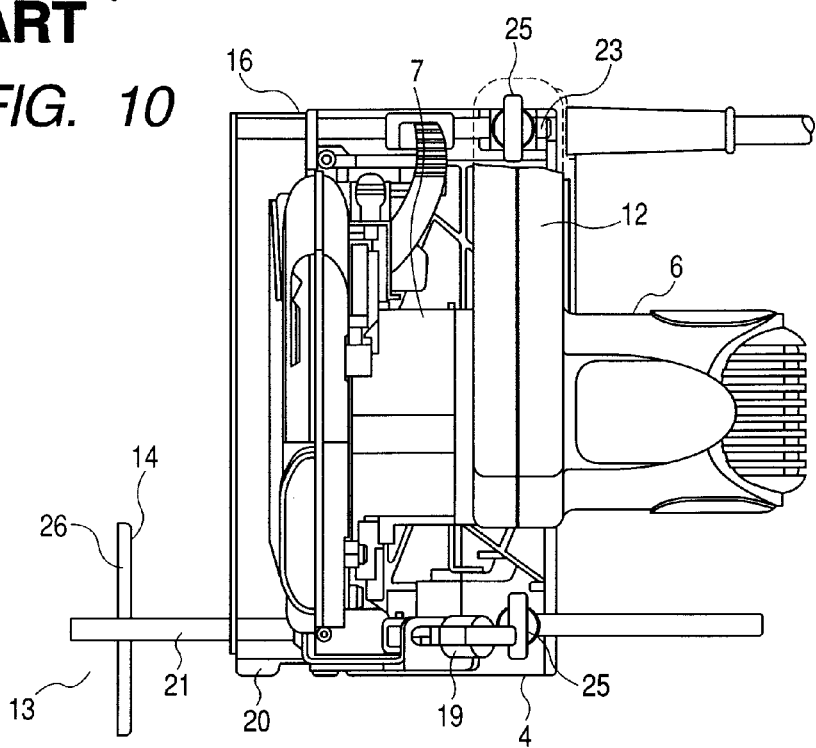
FIG. 10 is a plan view showing a state where the sub-base and the conventional guide are attached to the edge cutting circular saw.
Figure 11:
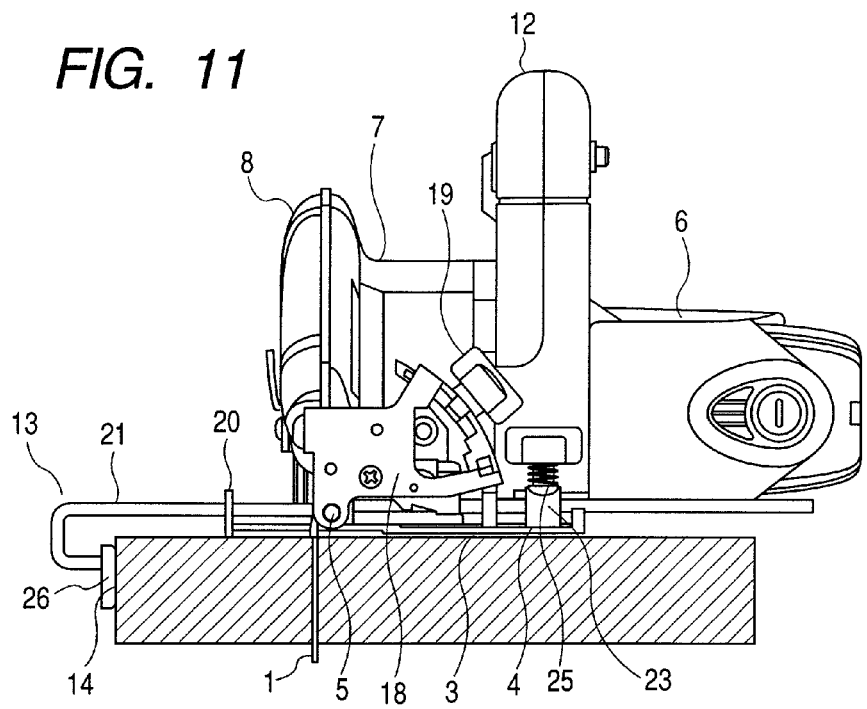
FIG. 11 is a partial cross sectional view showing cutting work in the state where the sub-base and the conventional guide are attached to the edge cutting circular saw.
Figure 12:
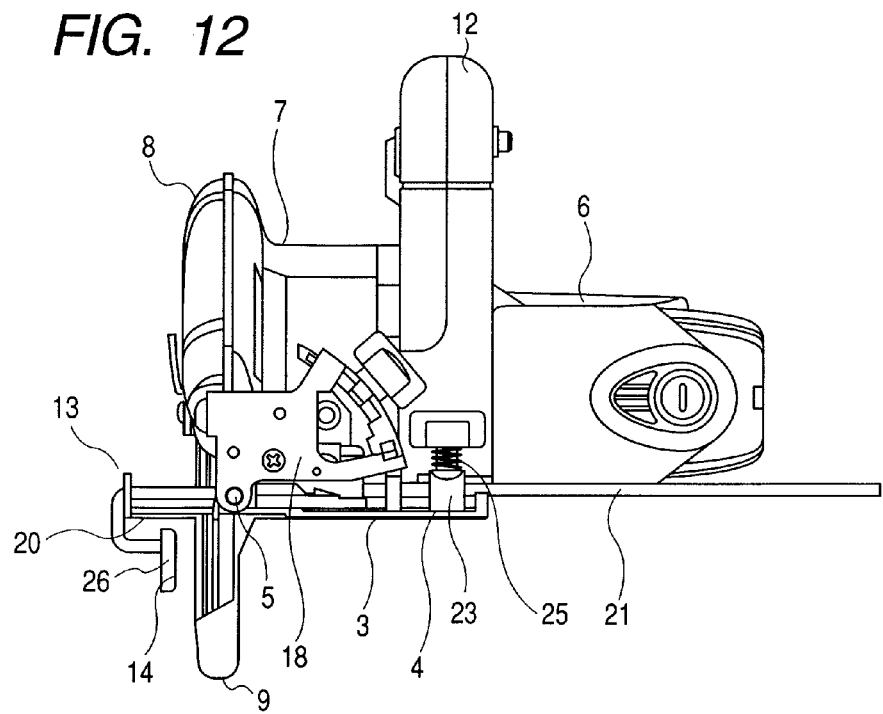
FIG. 12 is a right side view showing the state where the sub-base and the conventional guide are attached to the edge cutting circular saw.
Figure 13:
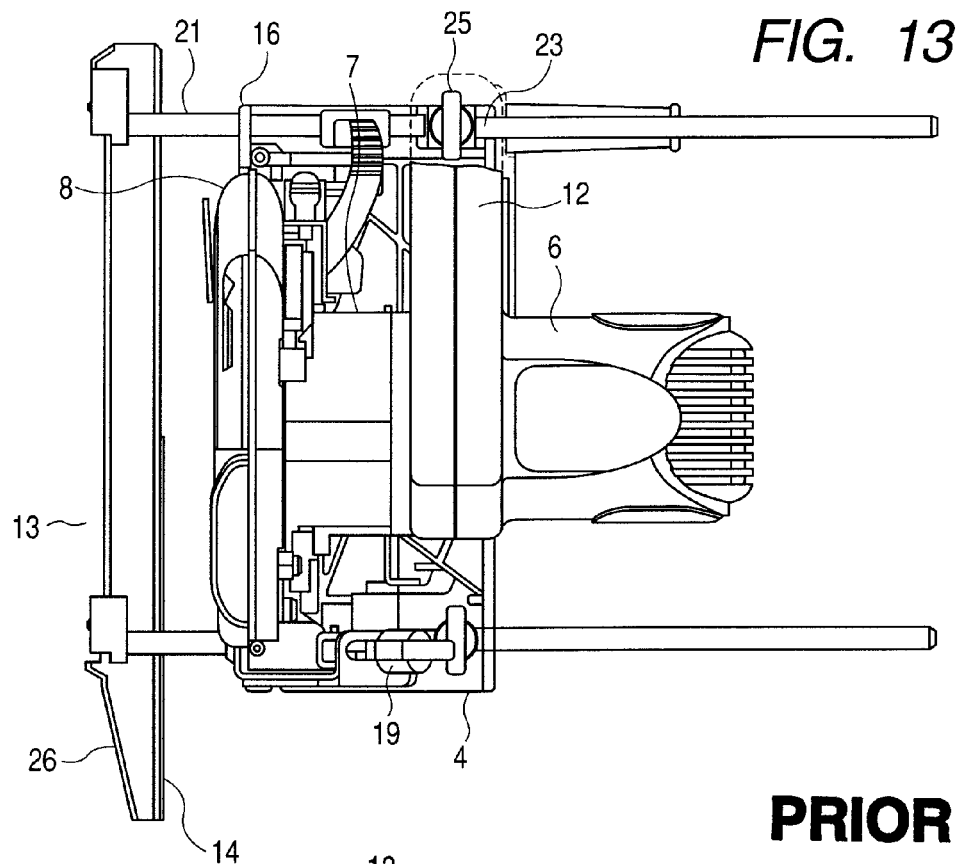
FIG. 13 is a plan view showing a state where the conventional guide is attached to the edge cutting circular saw.
Figure 14:
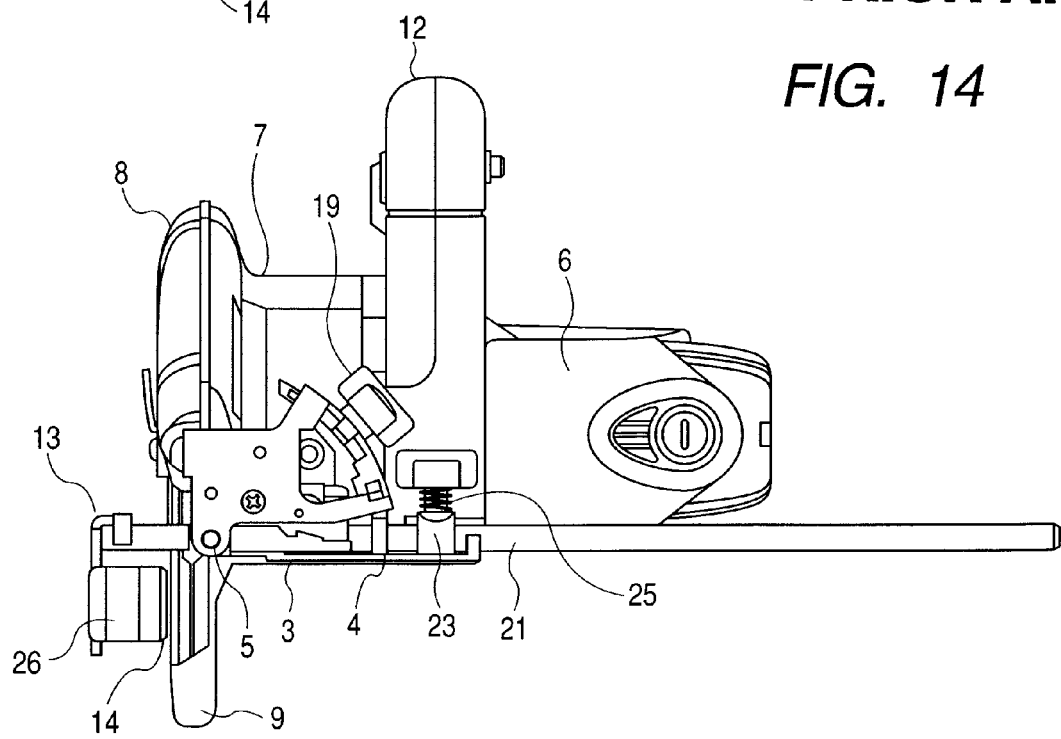
FIG. 14 is a right side view showing the state where the conventional guide is attached to the edge cutting circular saw.
Figure 15:
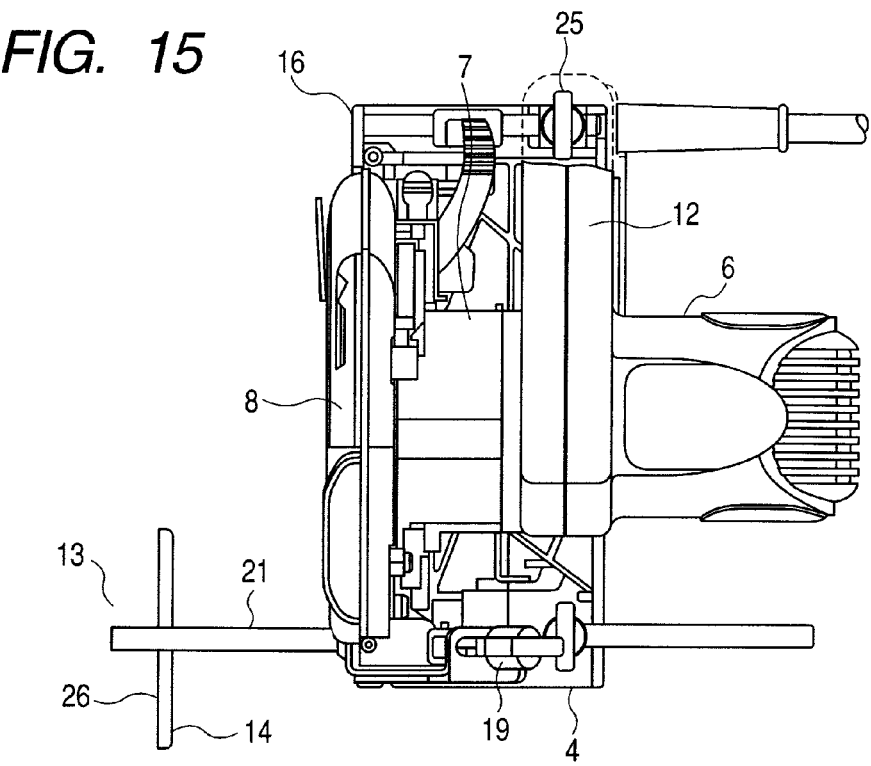
FIG. 15 is the plan view showing the state where the conventional guide is attached to the edge cutting circular saw.
Figure 16:
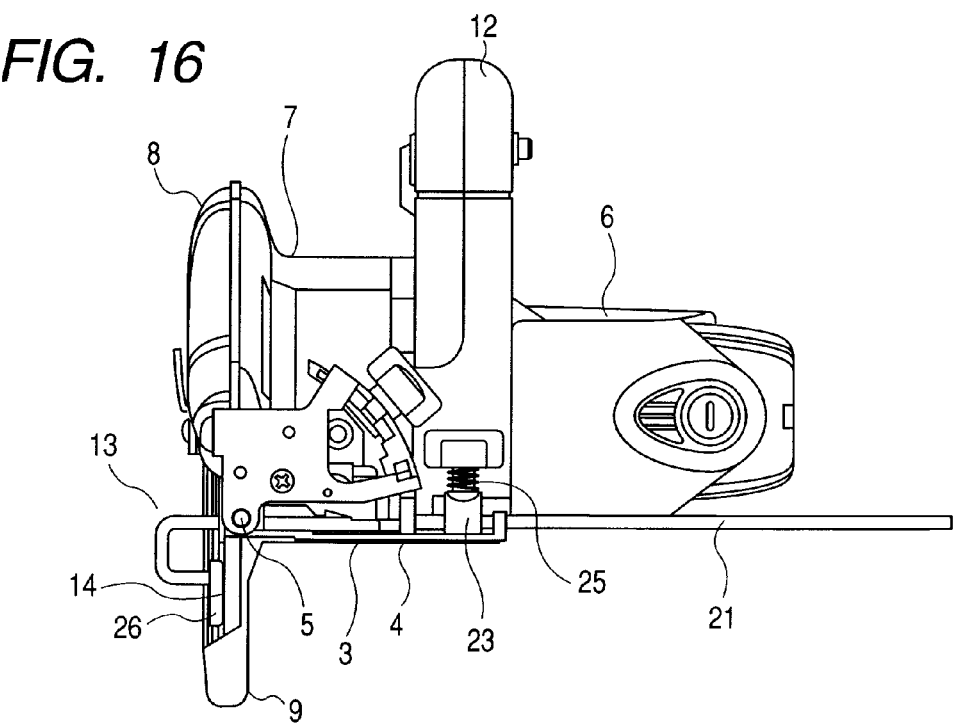
FIG. 16 is the right side view showing the state where the conventional guide is attached to the edge cutting circular saw.
Figure 17:
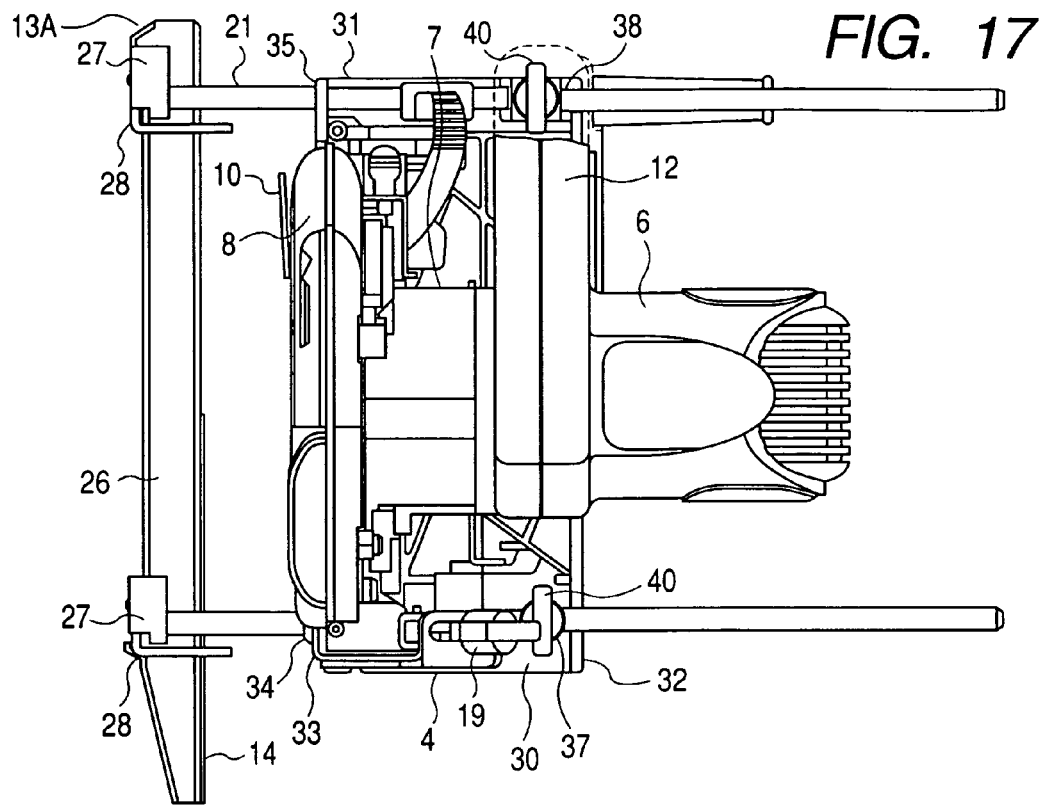
FIG. 17 is a plan view showing a state where a guide of the present invention is attached to the edge cutting circular saw.
Figure 18:
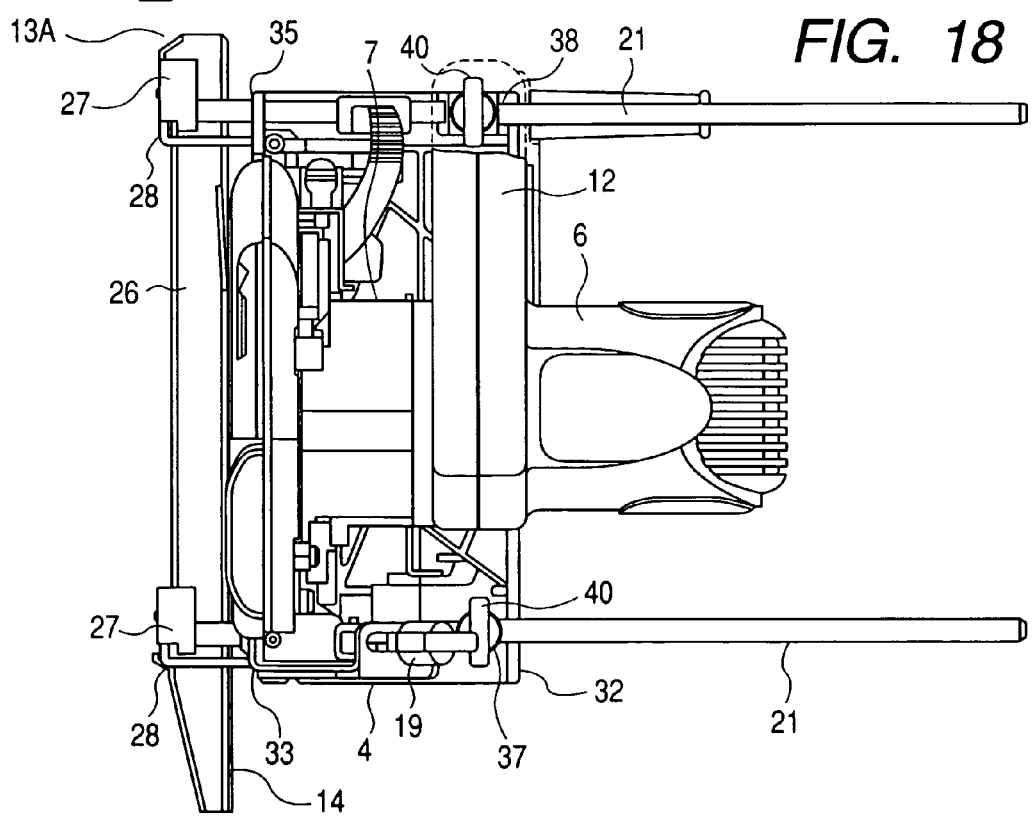
FIG. 18 is the plan view showing a state where the guide of the present invention is attached to the edge cutting circular saw.

As shown in FIG. 18, two guides, a first guide 13A having the guiding part 26 of which the length of a longitudinal direction of the guide surface 14 is the same as that of a side end 16 of a base 4 in a cutting direction, a second guide 13B having the guiding part 26 of which the length of the longitudinal direction of the guide surface 14 is half as that of the side end 16 of the base 4 in the cutting direction, have been known.

The first guide 13A straddles the rotating blade 1 in the cutting direction, and the two poles 21 are respectively provided in the front and back sides of the guide surface 14 of the first guide 13A in a direction orthogonal to the guide surface 14. Each pole 21 is connected to the guiding part 26 via a connection member 27. The connecting member 27 includes a pole connection part 27A connected to the pole 21 and a guide connection part 27B connected to the guiding part 26 having the guide surface 14 brought into slidable contact with the side surface of the material to be cut.

Figure 19:
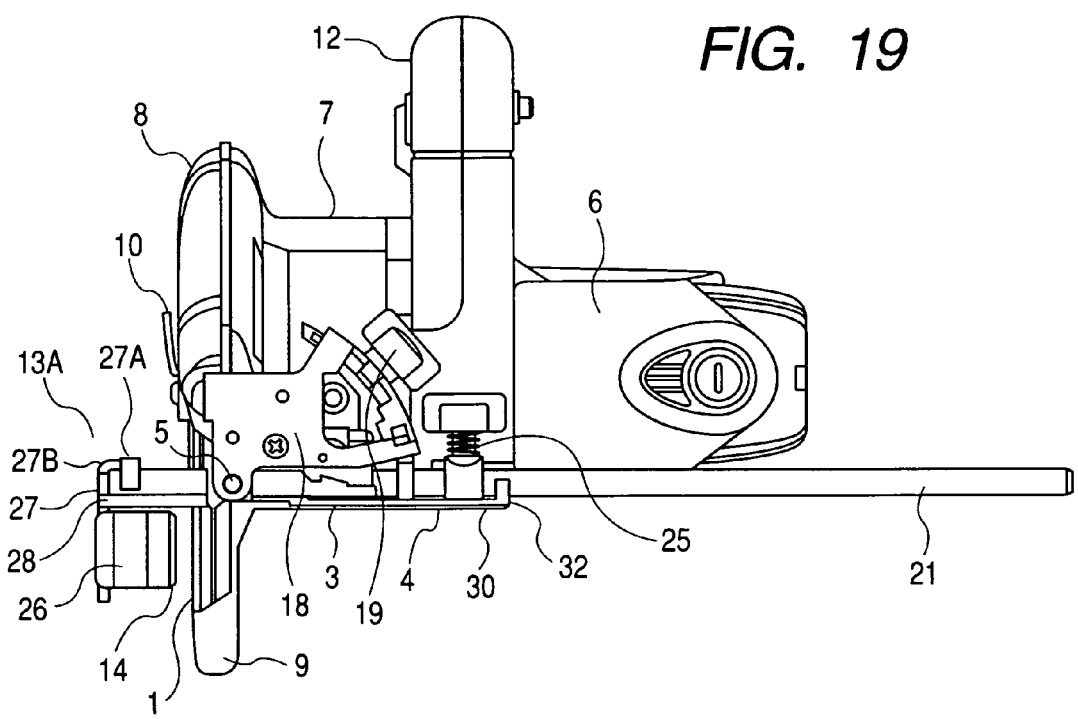
FIG. 19 is a right side view showing the state where the guide of the present invention is attached to the edge cutting circular saw.

As shown in FIG. 19, in a case where the first guide 13A is attached to a cutting tool main body 1 and the guiding part 26 between the pole 21 and the sliding surface 3 of the base 4, a movement regulating member 28 as contact preventing means for regulating an adjustment range of the guide 13A and preventing contact of the guide surface with the rotating blade 2 so as to project outside the guide surface 14 of the guiding part 26 is provided in the guide connection part 27A of the connection member 27.

Additionally, when a sub-base 20 or a dust guard 22 as a interposition member positioned between the guide 13 and the base 4 is attached to the portable circular saw, the connection member 27 comes into contact with a side end (the sub-base side end surface 50 or the dust guard end surface 43 described below) on the opposite side of the motor of the interposition member (the sub-base 20 or the dust guard 22) and the movement of the guide 13 is regulated. That is, when the interposition member is attached, the movement regulating member 28 does not come into contact with the side end 16 of the base 4 and does not function.

Figure 20:
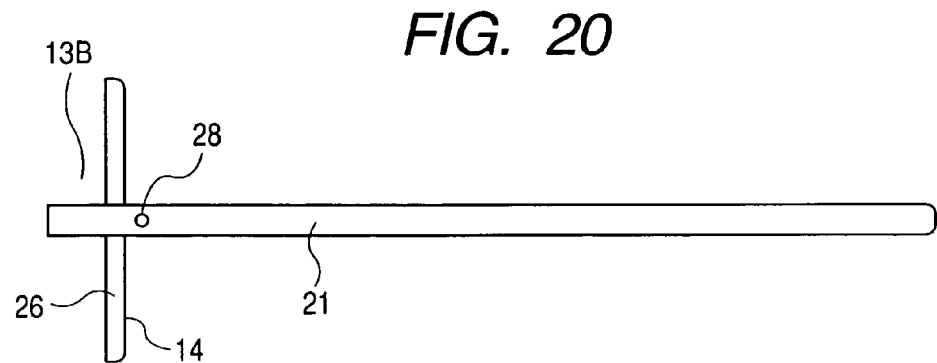
FIG. 20 is a plan view of the guide of the present invention.
Figure 21:
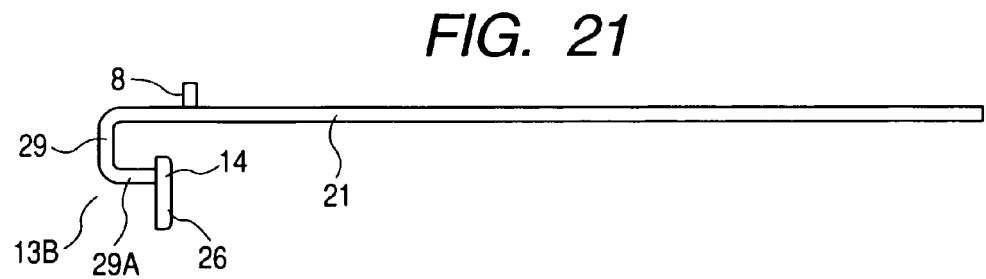
FIG. 21 is a front view of the guide of the present invention.
Figure 22:
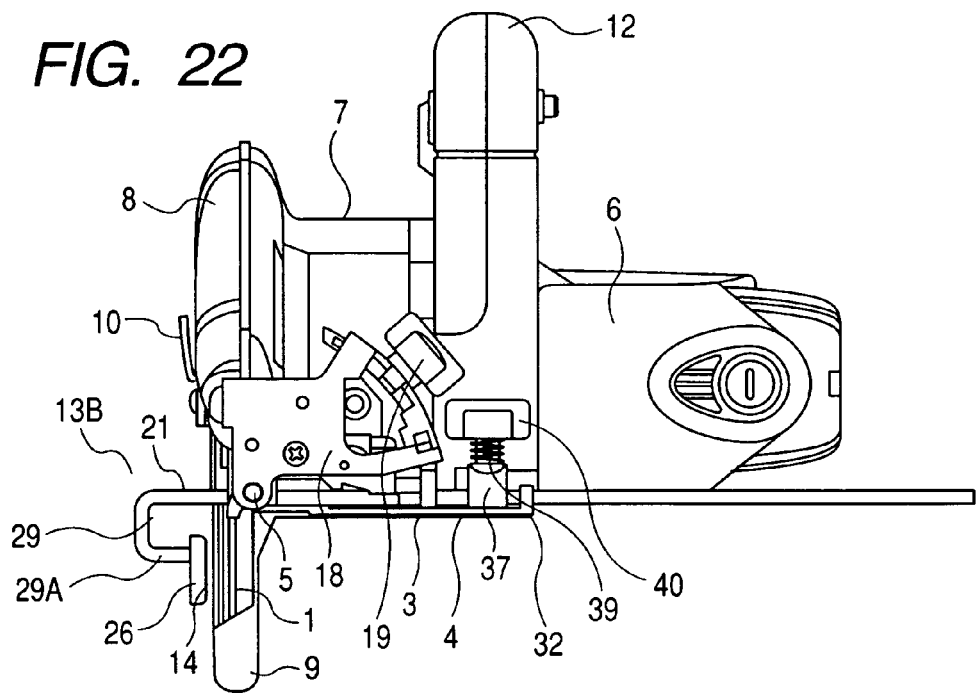
FIG. 22 is the right side view showing the state where the guide of the present invention is attached to the edge cutting circular saw.

As shown in FIG. 20 and FIG. 21, in the second guide, the pole 21 is provided in a direction orthogonal to the guide surface 14. An end of the pole 21 is bent so as to be parallel to the guide surface 14, orthogonal to the pole 21, and forms into a bent part 29. When the sub-base 20 as the interposition member positioned between the guide 13 and the base 4 is attached, the bent part 29 comes into contact with the sub-base 20. An end of the bent part 29 is further bent to be parallel to the pole 21, and a second guide connection part 29A connected to the guiding part 26 having the guide surface 14 is formed.

The movement regulating member 28, which projects from the pole 21 and can be brought into contact with the side end 16 of the base 4, is provided on the pole 21, and provided at the opposite side of the guide surface of the pole 21 further than the guide surface 14 of the guiding part 26.

Figure 26:
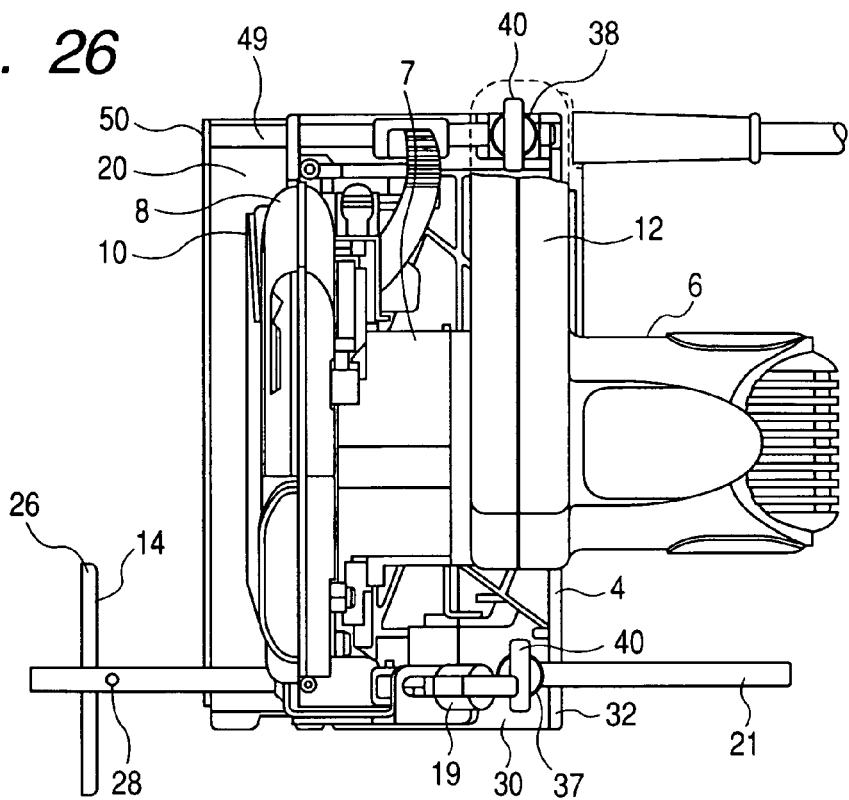
FIG. 26 is a plan view showing a state where the sub-base and the guide of the present invention are attached to the edge cutting circular saw.
Figure 28:
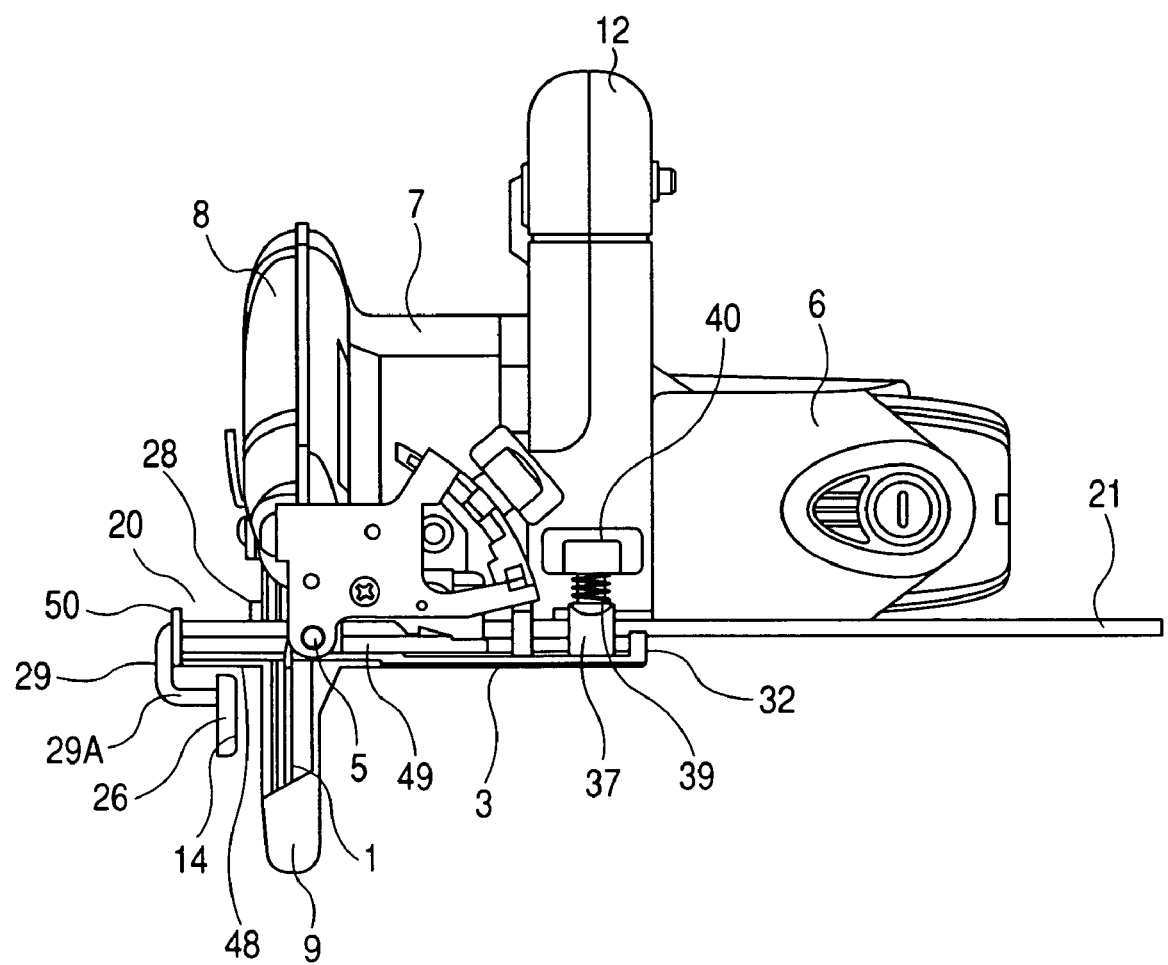
FIG. 28 is a right side view showing the state where the dust guard and the guide of the present invention are attached to the edge cutting circular saw.

When the sub-base 20 as the interposition member is attached as shown in FIG. 26, the bent part 29 comes into contact with a side end of the sub-base 20 as shown in FIG. 28, the movement regulating member 28 does not come into contact with the base 4. That is, when the interposition member is attached, the movement regulating member 28 does not come into contact with the end surface 16 of the base and does not function.

That is, when the guide 13 is attached to the portable cutting tool with the sub-base 20 or the dust guard 22 positioned between the guide 13 and the base 4 removed, the movement regulating member 28 comes into contact with the base 4 or a saw cover 8 to regulate the movement of the guide 13 and corresponds to the contact preventing means for preventing the guide surface 14 from being contacted with the rotating blade 1 or a safety cover 9.

A first side end 30 of the motor side of the base 4 and a second side end 31 on the opposite side of the motor of the base 4 are formed into a shape almost orthogonal to the slide surface 3 of the base 4, respectively have a shape of projecting to the cutting tool main body 2, and form a first side end surface 32 at the motor side and a second side end surface 33 at the opposite side of the motor, respectively. That is, the base 4 has an approximate U-shape as shown in FIG. 19.

On the base 4, the poles 21 of the guide 13 can be inserted across the rotating blade 1 in the cutting direction, in turn, in the cutting direction of the base 4, a second side end surface side front supporting part 34 and a second side end surface side back supporting part 35 which support the guide 13, are provided at the front and back sides of the second side end surface 33 in the cutting direction, respectively. Additionally, fixing means 36 for fixing the pole 21 of the guide 13 is provided on the base 4.

A first side end surface side front supporting part 37 and a first side end surface side back supporting part 38, into which the poles 21 are inserted respectively and which respectively have a female screw hole, are provided at the front and back sides of the first side end surface 32 side of the motor side of the base 4 in the cutting direction respectively, and have bolts 39 having male screws which are screwed with the female screw holes of the first side end surface side front supporting part 37 and the first side end surface side back supporting part 38 respectively, and threadably move forward and backward in the direction orthogonal to the slide surface 3. Further, a knob 40 is provided on the end of the opposite side of the slide surface 3 of the bolts 39.

The knob 40 is rotated by an operator to make the bolt 39 threadably move forward and backward in the female screw hole, an end of the slide surface 3 side of the bolt 39 comes into contact with the pole 21, thereby fixing the guide 13 at a desired position. That is, an attachment position of the guide 13 to the base 4 is changed so that the distance between the rotating blade 1 and the guide surface 14 can be adjusted.

Next, the dust guard 22 and the sub-base 20 will be described, which are attached in a case where an edge cutting circular saw is used for purposes other than the edge cutting and being the interposition member positioned between the guide 13 and the side end 16 of the base 4.

The dust guard 22 is slidably attached to the two poles 21 of the first guide 13A having the guiding part 26, of which the length is almost the same as that of the side end 16 of the base 4 in the cutting direction, in order to prevent generated dust from scattering when a material to be cut is cut by the cutting blade 1.

A guide piece 41 for aligning the rotating blade 1 to a marking-off line drawn on the upper surface of a material to be cut is provided at an end side of the longitudinal direction of the dust guard 22. A side where the guide piece 41 is provided is described hereinafter as the front side of the cutting direction at the time of attachment of the dust guard 22.

Figure 23:
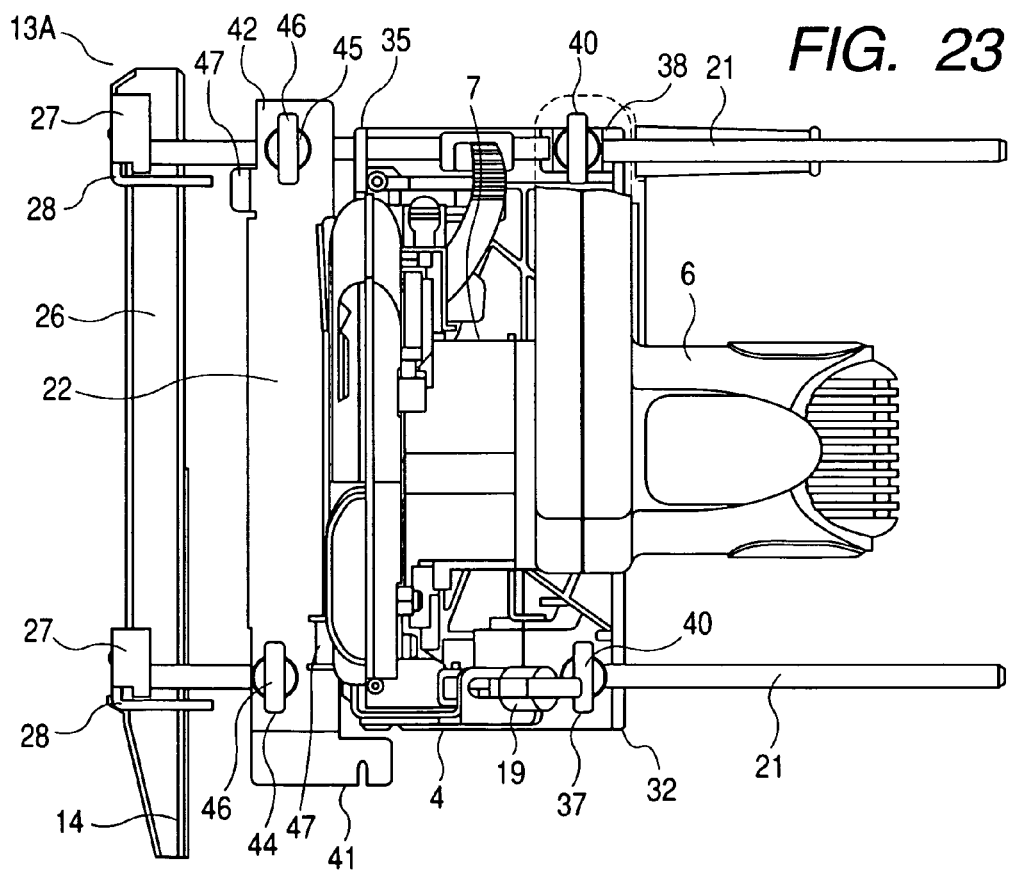
FIG. 23 is a plan view showing a state where the dust guard and the guide of the present invention are attached to the edge cutting circular saw.
Figure 24:
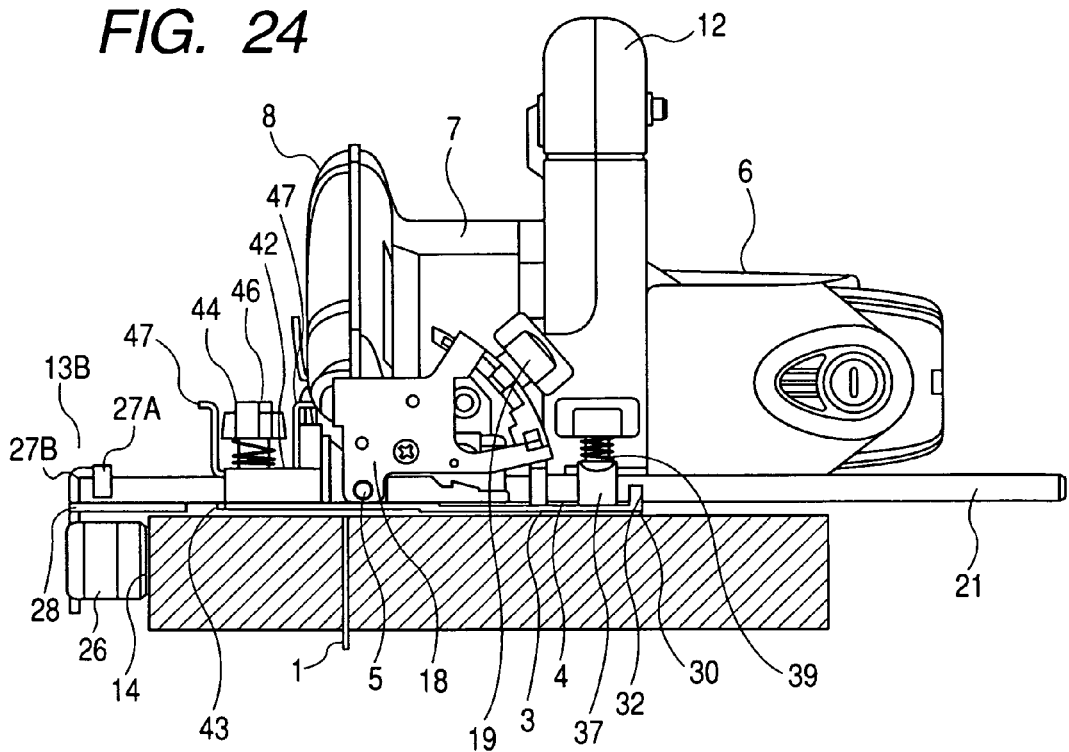
FIG. 24 is a partial cross sectional view showing cutting work in the state where the dust guard and the guide of the present invention are attached to the edge cutting circular saw.
Figure 25:
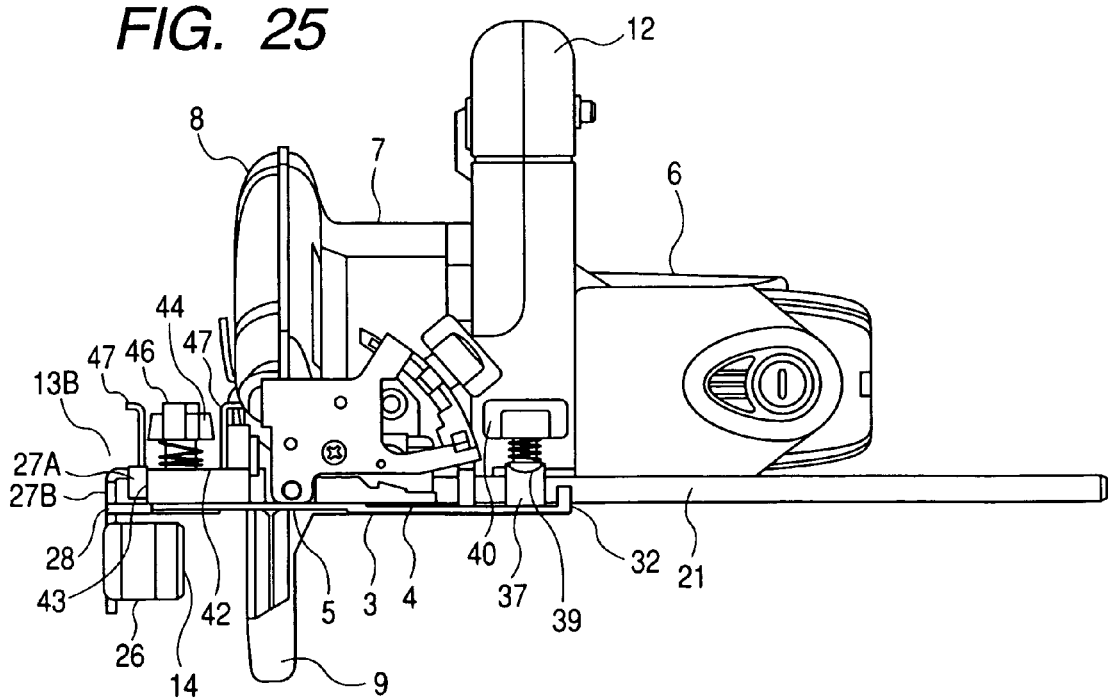
FIG. 25 is a right side view showing the state where the dust guard and the guide of the present invention are attached to the edge cutting circular saw.

The dust guard 22 has two surfaces, a top plate surface 42 almost parallel to an extension surface of the slide surface 3 of the base 4, and a dust guard side end surface 43 which is an end of the top plate surface 42, orthogonal to the slide surface 3 of the base 4, projecting in a direction opposite to the cutting tool main body 2 and located on the opposite side of the motor. As shown in FIG. 23 and FIG. 24, a dust guard front part fixing hole (not shown) and a dust guard back part fixing hole (not shown) are provided in the front and back sides of the top plate surface 42 in the cutting direction respectively, the fixing holes respectively having a female screw part. Dust guard fixing bolts 44 and 45 are provided having male screws which are screwed to the female screw parts of the dust guard front part fixing hole and the dust guard back part fixing hole respectively and threadably move forward and backward in the direction orthogonal to the slide surface 3. Further, knobs 46 are provided on ends of the opposite side of the slide surface 3 of the dust guard fixing bolts 44 and 45 respectively.

The dust guard fixing bolts 44 and 45 threadably move forward and backward and come into contact with the poles 21 of the first guide 13A respectively so that the dust guard 22 can be fixed to the desired position on the pole 21.

When the dust guard 22 is attached to the first guide 13A, an end of slide surface 3 side of the dust guard side end surface 43 is located on the opposite side of the motor, the cutting tool main body 2 side is located further than the slide surface 3. That is, when the dust guard 22 is attached to the first guide 13A, the dust guard 22 is located at the position not be in contact with a material to be cut.

Additionally, approximate L-shaped saw cover contact parts 47 capable of coming into contact with the saw cover 8 are provided on the front and back sides of the top plate surface 42 of the dust guard in the cutting direction respectively. When the cutting tool main body 2 is rotated to the opposite side of the motor with the fixing of the dust guard 22 and the first guide 13A released, the dust guard 22 slides on the poles 21 of the first guide 13A to the opposite side of the motor in accordance with the rotation of the cutting tool main body 2 owing to the contact of the saw cover contact part 47 and the saw cover 8.

The sub-base 20 having a sub-base slide surface 48, which is almost the same surface as the slide surface 3 of the base 4 and slidable on the upper surface of a material to be cut, is attached to the base 4 in order to reinforce the base 4 reduced in the width direction of the edge cutting circular saw. The sub-base 20 has two sub-base poles 49, crossing the rotating blade 1, in the longitudinal direction.

Sub-base supporting parts (not shown), into which the sub-base poles 49 are inserted respectively and which support the sub-base 20, are provided on the front and back sides of the base 4 in the cutting direction, respectively, in addition to the supporting parts for supporting the guide 13 which are provided on the base.

Figure 27:
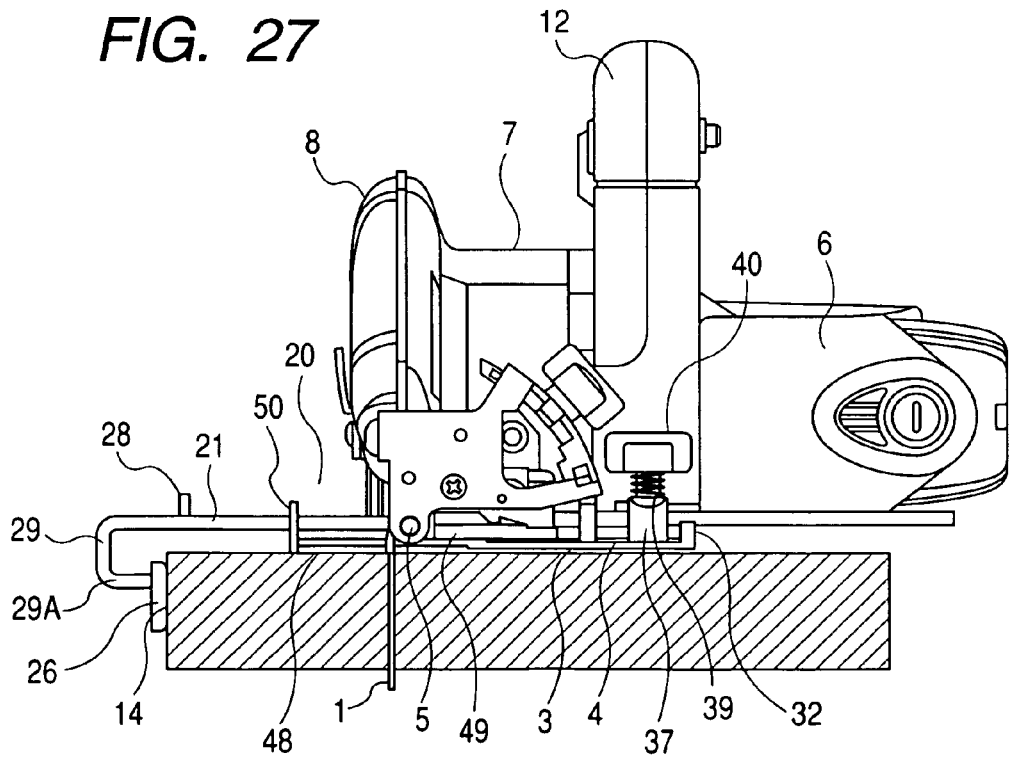
FIG. 27 is a partial cross sectional view showing cutting work in the state where the sub-base and the guide of the present invention are attached to the edge cutting circular saw.

As shown in FIG. 27 and FIG. 28, the sub-base 20 is in an approximate L-shape, and an end of the sub-base 20 in the width direction, a direction orthogonal to the cutting direction, projects in a direction orthogonal to the sub-base slide surface and forms a sub-base side end surface 50. A guide part (not shown) recessed so as to guide the pole 21 of the guide 13 is provided on the sub-base side end surface 50.

What is claimed is:

1. A portable cutting tool, comprising:
a cutting tool main body having a motor, a rotating blade rotationally driven by the motor and a saw cover having a shape so as to cover a part of the rotating blade; and
a base that is connected to the cutting tool main body and has a slide surface sliding on an upper surface of a material to be cut,
the base including:
a supporting part, and
a guide including a pole supported by the supporting part and a guiding part having a guide surface substantially orthogonal to the slide surface,
wherein an interposition member can be disposed so as to interpose between the guide and a side end of the base,
wherein a distance between the rotating blade and the guide surface is adjustable by changing an attachment position of the guide to the base, and
wherein the portable cutting tool includes a contact preventing unit that comes into contact with the interposition member when the guide is attached to the base while the interposition member is disposed between the guide and the base and that regulates an adjustment range of the guide to prevent contact of the guide surface and the rotating blade by coming into contact with the base when the guide is attached to the base while the interposition member is removed.

2. The portable cutting tool according to claim 1, wherein the interposition member is a sub-base which is attachable/detachable to/from the base and has a sub-base slide surface almost the same as the slide surface.

3. The portable cutting tool according to claim 1, wherein the interposition member is a dust guard provided on the pole so as to be movable along a longitudinal direction of the pole.

4. The portable cutting tool according to claim 1, wherein the cutting tool main body rotatably connected to the base, and
wherein the rotating blade is projectable outwardly from the base side surface by rotating the cutting tool in relation to the base during a cutting work.

5. A portable cutting tool, comprising:
a cutting tool main body having a motor, a rotating blade rotationally driven by the motor and a saw cover having a shape so as to cover a part of the rotating blade; and
a base that is connected to the cutting tool main body and has a slide surface sliding on an upper surface of a material to be cut,
the base including:
a supporting part, and
a guide including a pole supported by the supporting part and a guiding part having a guide surface substantially orthogonal to the slide surface,
wherein an interposition member can be disposed so as to interpose between the guide and a side end of the base,
wherein a distance between the rotating blade and the guide surface is adjustable by changing an attachment position of the guide to the base,
wherein the portable cutting tool includes a contact preventing unit for regulating an adjustment range of the guide to prevent contact of the guide surface and the rotating blade when the guide is attached to the base while the interposition member is removed, and
wherein the contact preventing unit includes a movement regulating member provided on the guide, the movement regulating member coming into contact with a part of the base to regulate the adjustment range of the guide.

6. The portable cutting tool according to claim 5, wherein the part of the base is a side end of the base.

7. A portable cutting tool, comprising: a cutting tool main body having a motor, a rotating blade rotationally driven by the motor and a saw cover having a shape so as to cover a part of the rotating blade; and
a base that is connected to the cutting tool main body and has a slide surface sliding on an upper surface of a material to be cut,
the base including:
a supporting part, and
a guide including a pole supported by the supporting part and a guiding part having a guide surface substantially orthogonal to the slide surface,
wherein an interposition member can be disposed so as to interpose between the guide and a side end of the base,
wherein a distance between the rotating blade and the guide surface is adjustable by changing an attachment position of the guide to the base,
wherein the portable cutting tool includes a contact preventing unit for regulating an adjustment range of the guide to prevent contact of the guide surface and the rotating blade when the guide is attached to the base while the interposition member is removed, and wherein the contact preventing unit includes a movement regulating member disposed on the pole and a contact part disposed on the base.

8. A portable cutting tool, comprising:

a cutting tool main body having a motor, a rotating blade rotationally driven by the motor and a saw cover having a shape so as to cover a part of the rotating blade; and a base that is connected to the cutting tool main body and has a slide surface sliding on an upper surface of a material to be cut, the base including:

a supporting part, and a guide including a pole supported by the supporting part and a guiding part having a guide surface substantially orthogonal to the slide surface, wherein an interposition member can be disposed so as to interpose between the guide and a side end of the base, wherein a distance between the rotating blade and the guide surface is adjustable by changing an attachment position of the guide to the base, wherein the portable cutting tool includes a contact preventing unit for regulating an adjustment range of the guide to prevent contact of the guide surface and the rotating blade when the guide is attached to the base while the interposition member is removed wherein the interposition member is a dust guard provided on the pole so as to be movable along a longitudinal direction of the pole, wherein the pole includes two poles, wherein the dust guard is provided on the two poles movably along a longitudinal direction thereof, and wherein the contact preventing unit is provided so as not to contact with the dust guard.

9. A guide attachable to a portable cutting tool wherein the portable cutting tool includes:

a cutting tool main body having a motor, a rotating blade rotationally driven by the motor and a saw cover having a shape so as to cover a part of the rotating blade; and a base that is connected to the cutting tool main body and has a slide surface sliding on an upper surface of a material to be cut, the base including a supporting part, and a guide including a pole supportable by the supporting parts and a guiding part having a guide surface substantially orthogonal to the slide surface, wherein an interposition member can be disposed so as to interpose between the guide and a side end of the base;

wherein a distance between the rotating blade and the guide surface is adjustable by changing an attachment position of the guide to the base and wherein the guide further includes a contact preventing unit that comes into contact with the interposition member when the guide is attached to the base while the interposition member is disposed between the guide and the base and that regulates an adjustment range of the guide to prevent contact of the guide surface and the rotating blade by coming into contact with the base when the guide is attached to the base while the interposition member is removed.

* * * * *